United States Patent [19]
Kofman

[11] Patent Number: 5,865,145
[45] Date of Patent: Feb. 2, 1999

[54] LIVESTOCK FLOORING SYSTEM

[76] Inventor: Abram Kofman, 155 Beech 19 St. Apt. 7K, Far Rockaway, N.Y. 11691

[21] Appl. No.: 4,083

[22] Filed: Jan. 8, 1998

[51] Int. Cl.$^6$ ....................................................... A01K 1/00
[52] U.S. Cl. ........................................... 119/527; 119/525
[58] Field of Search ................................... 119/509, 525, 119/527, 528, 450; 52/292

[56] References Cited

U.S. PATENT DOCUMENTS

| | | | |
|---|---|---|---|
| 686,553 | 11/1901 | Spengler | 119/528 |
| 714,677 | 12/1902 | Combs | 119/528 |
| 746,094 | 12/1903 | Judson | 119/450 |
| 3,718,119 | 2/1973 | Stevenson | 119/442 |
| 4,183,324 | 1/1980 | Nobbe | 119/509 |

FOREIGN PATENT DOCUMENTS

2004146-C1  12/1993  Russian Federation ............... 119/525

*Primary Examiner*—Michael J. Carone
*Assistant Examiner*—James S. Bergin

[57] ABSTRACT

A new livestock flooring system for providing an inexpensive, durable, and convenient floor for animal pens such as the pens used for pigs, horses, cows and calves. The inventive device includes a rammed sand base, and a cement and pine chock floor, sloped for drainage.

4 Claims, 1 Drawing Sheet

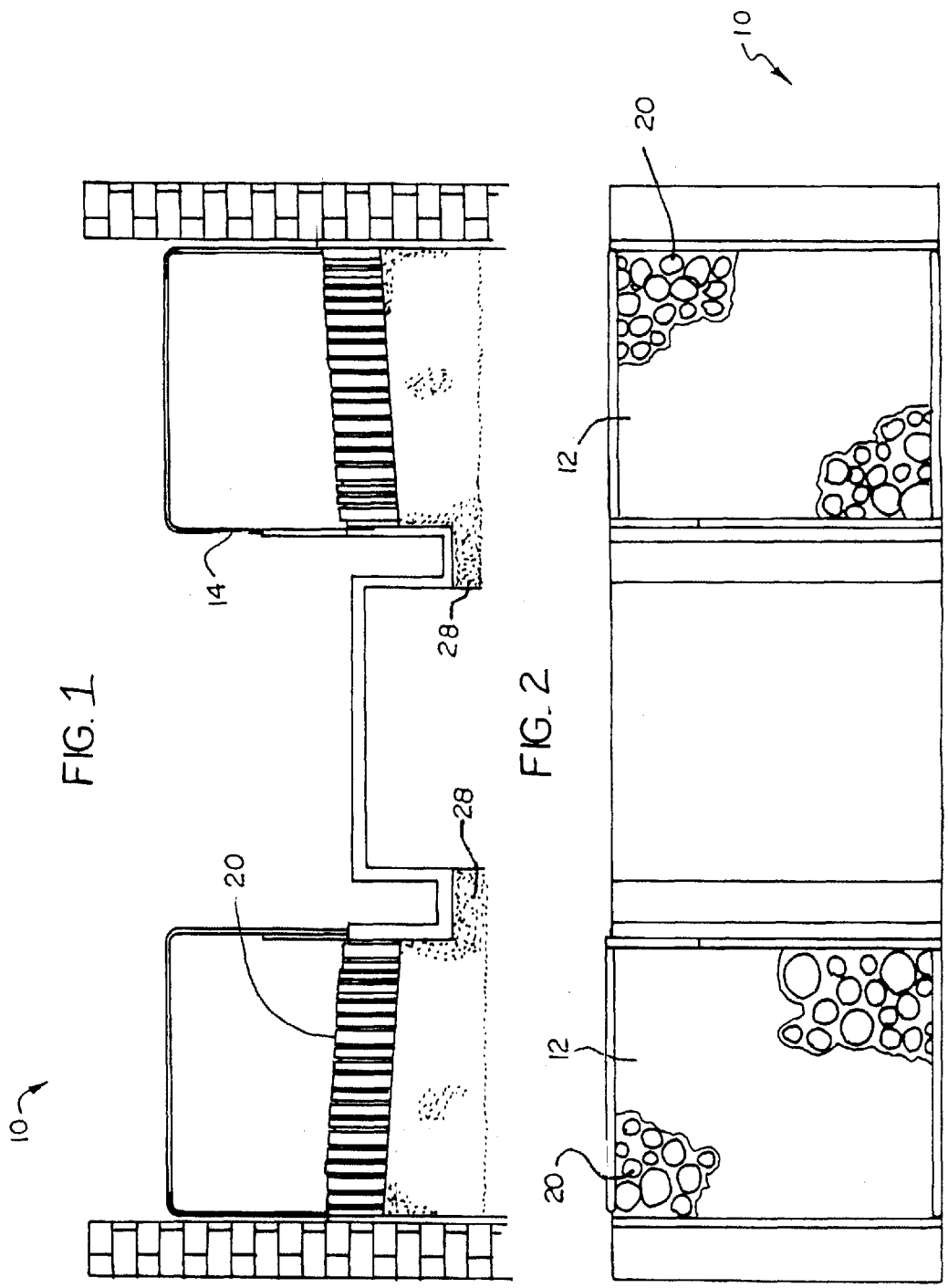

LIVESTOCK FLOORING SYSTEM

BACKGROUND OF THE INVENTION

1. Field of the Invention

The present invention relates to flooring materials and more particularly pertains to a new livestock flooring system for providing an inexpensive, durable, and convenient floor for animal pens such as the pens used for pigs, horses, cows and calves.

2. Description of the Prior Art

The use of flooring materials is known in the prior art. More specifically, flooring materials heretofore devised and utilized are known to consist basically of familiar, expected and obvious structural configurations, notwithstanding the myriad of designs encompassed by the crowded prior art which have been developed for the fulfillment of countless objectives and requirements.

Known prior art flooring materials include U.S. Pat. No. 5,257,597 issued to Feuerhelm on 2 Nov. 1993; U.S. Pat. No. 4,362,128 issued to Downey on 7 Dec. 1982; U.S. Pat. No. 4,953,501 issued to Moreau on 4 Sep. 1990; U.S. Pat. No. 4,976,221 issued to Yetter on 11 Dec. 1990; U.S. Pat. No. 4,794,879 issued to Thom et al. on 3 Jan. 1989, and U.S. Pat. No. Des. 352,119 issued to Kallioniemi on 1 Nov. 1994.

While these devices fulfill their respective, particular objectives and requirements, the aforementioned patents do not disclose a new livestock flooring system. The inventive device includes a sand base, and a cement and pine chock floor, sloped for drainage.

In these respects, the livestock flooring system according to the present invention substantially departs from the conventional concepts and designs of the prior art, and in so doing provides an apparatus primarily developed for the purpose of providing an inexpensive, durable, and convenient floor for animal pens such as the pens used for pigs, horses, cows and calves.

SUMMARY OF THE INVENTION

In view of the foregoing disadvantages inherent in the known types of flooring materials now present in the prior art, the present invention provides a new livestock flooring system construction wherein the same can be utilized for providing an inexpensive, durable, and convenient floor for animal pens such as the pens used for pigs, horses, cows and calves.

The general purpose of the present invention, which will be described subsequently in greater detail, is to provide a new livestock flooring system apparatus and method which has many of the advantages of the flooring materials mentioned heretofore and many novel features that result in a new livestock flooring system which is not anticipated, rendered obvious, suggested, or even implied by any of the prior art flooring materials, either alone or in any combination thereof.

To attain this, the present invention generally comprises a rammed sand base, and a cement and pine chock floor, sloped for drainage. The pine chocks extend about ½" above the cement to allow water and the like to drain and therefore keep the animals dry.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new livestock flooring system apparatus and method which has many of the advantages of the flooring materials mentioned heretofore and many novel features that result in a new livestock flooring system which is not anticipated, rendered obvious, suggested, or even implied by any of the prior art flooring materials, either alone or in any combination thereof.

It is another object of the present invention to provide a new livestock flooring system which is simple to construct and fast to install.

It is a further object of the present invention to provide a new livestock flooring system which is of a durable and reliable construction.

An even further object of the present invention is to provide a new livestock flooring system which has a low cost of manufacture with regard to both materials and labor, and which accordingly is then susceptible of low prices of sale to the consuming public, thereby making such livestock flooring system economically available to the buying public.

Still yet another object of the present invention is to provide a new livestock flooring system which provides in the apparatuses and methods of the prior art some of the advantages thereof, while simultaneously overcoming some of the disadvantages normally associated therewith.

Still another object of the present invention is to provide a new livestock flooring system for providing an inexpensive, durable, and convenient floor for animal pens such as the pens used for pigs, horses, cows and calves.

Yet another object of the present invention is to provide a new livestock flooring system which includes a rammed sand base, and a cement and pine chock floor, sloped for drainage. The system is not believed to subject the animals to disease.

Still yet another object of the present invention is to provide a new livestock flooring system that will keep animals on a warm and dry floor. The flooring system does not require heating and drying, which saves electrical and heating expenses.

Even still another object of the present invention is to provide a new livestock flooring system that livestock will prefer to stand on resulting in an increase in daily and annual growth rates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a cross sectional view of the invention.

FIG. 2 is a plan view of the invention.

DESCRIPTION OF THE PREFERRED EMBODIMENT

With reference now to the drawings, and in particular to FIGS. 1 and 2 thereof, a new livestock flooring system embodying the principles and concepts of the present invention and generally designated by the reference numeral 10 will be described.

The invention comprises a rammed sand base 28, and a cement and pine chock 20 floor sloped for drainage. The invention includes new flooring construction and materials for providing an inexpensive, durable and convenient flooring system 10 for use in an animal pen 12. The flooring system is useful for livestock pens, especially those housing pigs, horses, cows, and calves.

Pine chocks 20 cut from firewood with a diameter greater than or equal to four inches are put on a rammed sand base 28. The rammed sand base 28 is about eight inches deep. A pitch for the drainage of impurities should be determined based upon the project conditions. The height of the pine chocks 20 is about six inches. The bark should be taken off the firewood before the firewood is cut into six inch chocks 20.

The chocks 20 are set vertically in place, fitted tightly to each other and between the pen walls 14. Liquid cement is mixed to consist of one part cement to two parts of sand, with water added to get the needed consistency. The gaps between the chocks are filled with the liquid cement mix. The mix should be poured ½ to 1 inch lower that the top of the pine chocks.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A livestock flooring system comprising:

a sand base;

a plurality of vertically oriented logs having bottom ends rammed within the sand such that the logs are in tight abutment;

concrete poured between the logs such that top ends of the logs protrude up and out of the cement for a protruding height;

wherein the logs each have a length of about 6 inches;

wherein the logs are oriented to afford a pitch.

2. A livestock flooring system as set forth in claim 1 wherein the protruding height is between about ½ to 1 inch.

3. A livestock flooring system as set forth in claim 1 wherein the sand is about 8 inches in depth.

4. A livestock flooring system comprising:

a concrete base with a level intermediate portion flanked by a pair of drainage ditches each having a pen positioned adjacent thereto with flooring sloped for drainage into the drainage ditches;

wherein the pens are defined by pen walls;

wherein the flooring includes sand, a plurality of vertically oriented logs having bottom ends rammed within the sand such that the logs are in tight abutment, and concrete poured between the logs such that top ends of the logs protrude up and out of the cement for a protruding height;

wherein the logs each have a length of about 6 inches;

wherein the protruding height is about 1 inch;

wherein the sand is about 8 inches in depth.

* * * * *